Patented Feb. 8, 1944

2,341,115

UNITED STATES PATENT OFFICE 2,341,115

ART OF MAKING SYNTHETIC RESINS

Emil E. Novotny, Oak Lane, Pa., assignor to Durite Plastics, Incorporated, Philadelphia, Pa., a corporation of Pennsylvania No Drawing. Application January 6, 1940, Serial No. 312,685

9 Claims. (Cl. 260—43)

The present invention relates to the art of making synthetic resins, and has particular reference to synthetic resins derived from the shell liquids of certain nuts of the cashew family, e. g. the cashew and marking nuts. More particularly stated, the invention concerns itself with resins produced by reacting the shell liquids with a resinous phenol of the type which contains at least one reactive phenolic hydroxyl group, which does not contain an aldehyde-derived carbon atom which can constitute a point of reaction, which does not react after the manner of aldehydes, and which does not liberate or render available any appreciable amount of aldehyde for reaction with the shell liquids.

The primary object of the invention is to provide a distinctively new class of synthetic resins, which, as will hereinafter be pointed out in considerable detail, are characterized by an unusual combination of qualities which render them exceptionally suitable for a wide range of useful applications in the industry.

Another important object is to provide a method for producing synthetic resins from the shell liquids of the cashew and marking nuts, which can be controlled with considerably less difficulty than had been considered possible in the prior art to produce uniform products of an intermediate stage of reaction, condensation or polymerization, which lends itself readily to both chemical and technical control, and which is susceptible of being practiced on a large commercial scale.

Another important object is to provide synthetic resins of the foregoing class, which depending upon a number of controllable factors to be hereinafter enumerated, vary considerably in both physical and chemical properties. This fact renders it possible to produce a synthetic resin having predetermined physical and chemical properties and suitable for desired purposes and applications.

Another important object is to provide potentially reactive resins of the foregoing class, which are uniformly grindably hard, brittle solids having definite melting points, and which, by reason of these properties, are well suited for the manufacture of molding compositions and the fabrication of shaped articles.

Another important object is to provide resins possessed of an extraordinarily low volatile content and which are possessed of great heat stability, so that, when used with suitable heat stable fillers, they are preeminently suited for the manufacture and fabrication of articles for use at elevated temperatures.

Another important object is to provide a class of relatively inexpensive compositions containing synthetic resins, the low cost of the compositions being due in part to the fact that the synthetic resins can be easily made from readily available low priced raw materials, and in part to the fact that large quantities of very inexpensive ingredients such as gum accroides may be incorporated with the synthetic resins.

Another important object is the provision of synthetic resins that are inherently possessed of the property of imparting a "high flow" to molding powders and compositions produced therefrom. This property renders it possible to use the compositions of the present invention for many applications where previously known materials would be unsuitable. It also permits the incorporation of unusually high percentages of inexpensive fillers, thereby further decreasing the cost of the resultant product, and in many cases endowing the resultant product with distinctive physical characteristics.

Another important object is to provide resins that are possessed of an excellent shock resistance, that is, high impact strength.

Another important object is to provide resins of a low specific gravity—decidedly lower than that of the common thermosetting potentially reactive resins. This feature permits savings in poundage of resin required per unit volume of molded articles, or, again, this feature may be utilized so as to result in the fabrication of lighter-weight articles.

Another important object is to provide resins possessed of high frictional coefficients and which, therefore, are preeminently suited for the production of frictional elements.

Another important object is to provide resins that can resist electric arcing to an unusual degree.

Another important object is to provide resins possessed of high dielectric constants and very low electrical conductivities, characteristics which render the products of the invention particularly well adapted to comply with the strict requirements of the electrical industry.

Another important object is to provide resins possessed of a superior water resistance, and which can resist the effects of organic solvents, dilute acids, and dilute alkalies better than the usual types of phenol-formaldehyde resins.

A further object of importance is to provide synthetic resins derived from the shell liquids of the cashew and marking nuts, which are capable of reacting with suitable hardening agents, and which can under the influence of heat and pressure, be made to set up and cure to a point where they are possessed of a hardness, strength, durability and toughness that renders the resins of particular utility in the molding field.

Still another important object is to provide resins derived from the shell liquids of the cashew and marking nuts which are characterized by the fact that they are odorless and exhibit remarkable stability or keeping qualities.

Before discussing the invention in detail, it should be pointed out that prior to the present invention it was unknown that the shell liquids of the nuts of the cashew family could react with substances whose sole specific functional characteristic is a reactive phenolic hydroxyl group. This reaction constitutes the basis of the invention. It should also be pointed out that the reaction between the shell liquids and substances containing reactive phenolic hydroxyl groups is a general one and is wholly independent of any resinous attributes that may be possessed by the phenolic substance, and is, furthermore, dependent upon the absence of free or uncombined aldehydes. Application Serial No. 204,998, filed April 29, 1938, by E. E. Novotny and G. K. Vogelsang, concerns itself with synthetic resins prepared by reacting the shell liquids with the non-resinous substances, while the present invention relates to the synthetic resins prepared by reacting the shell liquids with resinous phenolic substances.

I am aware that it has been proposed in United States Patent No. 1,725,797, issued August 27, 1929, to M. T. Harvey to react cashew nut shell liquid with a free or uncombined aldehyde such as formaldehyde or acetaldehyde, and to use the formaldehyde from phenol-formaldehyde condensation products for this reaction with or without the addition of other aldehyde. The foregoing reaction, however, has certain very objectionable features as will hereinafter be pointed out, and in carrying out the teachings of the present invention I aim to avoid reacting the shell liquids with formaldehyde either in free uncombined form or combined with phenols in such a way as to take part in the reaction with the shell liquids. It may also be noted at this point that the products obtained in accordance with my method differ radically in both characteristics and capabilities from the products of Harvey's process.

I am also aware that it has been proposed in United States Patent 2,102,130, issued December 15, 1937, to J. B. Rust to solubilize a phenol-formaldehyde resin in drying oils by treating the resin with a modicum of a drying oil such as tung oil, linseed oil or cashew nut shell liquid. As an illustrative example, a specially prepared cresol-formaldehyde resin, which is readily soluble in heated cashew nut shell liquid, is heated with cashew nut shell liquid until a product soluble in tung and linseed oil is obtained. Rust's method is restricted to resins that are soluble in cashew nut shell liquid to begin with, and the products are necessarily soluble in drying oils and hence particularly suitable for the preparation of varnishes. Applicant's invention, on the other hand, is not restricted to the use of resins initially soluble in cashew nut shell liquid, and the products are substantially insoluble in drying oils, being particularly suitable for the preparation of potentially reactive or thermosetting compositions adapted for use in the molding field.

In its very essence, the method of the invention consists in heating the shell liquid of the cashew nut (*Anacardium occidentale*) or the marking nut (*Anacardium orientale* or *Semecarpus anacardium*) under controlled or regulated conditions with a fusible resinous phenol of the type which contains at least one reactive phenolic hydroxyl group, and which does not contain an aldehyde-derived carbon atom which can constitute a point of reaction, which does not react as or in the manner of aldehydes, and which under the conditions of the reaction does not liberate or render available any appreciable amount of aldehyde for reaction with the shell liquid. The reaction between the shell liquid and the resinous phenol apparently takes place because of the influence of the phenolic hydroxyl group, and it is essential to the teachings of this invention that reaction of the shell liquid with an aldehyde or aldehydic group be carefully avoided. For this reason, resinous phenols or phenolic resins such as gum accroides and dragon's blood, which do not contain an aldehyde, are particularly well adapted for use in practicing the invention. Phenol-aldehyde resins, which contain reactive phenolic hydroxyl groups and which do not readily liberate or render available reactive aldehyde or aldehydic groups, or which contain aldehydic groups which do not readily react with the nut shell liquids, are also very well adapted for the purposes of this invention. Examples of such phenolic resins will be hereinafter given. However, it may be stated at this point that I have found it preferable and particularly advantageous to employ phenolic resins of the type that can be reacted with suitable hardening agents to set up to strong thermorigid masses. For example, a phenol-formaldehyde resin is to be preferred to a xylenol-formaldehyde resin.

As will hereinafter be pointed out, the details of procedure may be varied considerably, and catalysts may be used, if desired, to assist the reaction and to enable the reaction to go to the desired stage of condensation or polymerization at lower temperatures, it being essential, in any event, that the reaction be carried out with heat in the absence of appreciable amounts of free or uncombined aldehydes.

The presence of aldehyde in appreciable amounts appears to render the reaction exceedingly difficult to control and almost invariably results in the formation of substantial amounts of rubbery substances which are dispersed throughout the reaction mixture. The formation of these rubbery substances renders difficult its further processing to a point where a grindably hard, yet fusible product is obtained. They are particularly objectionable when it is desired to obtain a hard and grindable yet fusible resin suitable for the preparation of molding compositions.

In practicing the invention, either the raw shell liquids of commerce or the decarboxylated products may be employed. The raw liquids are generally to be preferred, for the reason that the resulting products have much better keeping qualities than the products prepared from preheated liquids. The raw liquids, however, have the disadvantage of foaming copiously at elevated temperatures due to the presence of water. This disadvantage can very readily be overcome without adversely affecting the keeping qualities of the resultant product by decarboxylating the raw liquids by a short heat treatment at a relatively low temperature. Shell liquids decarboxylated in this manner give rise to very little, if any, foaming during reaction with suitable phenolic resins.

At this point it should be noted that the reaction between the shell liquids and the resinous substances is a complex function of a large number of mutually dependent variables which include the following factors:

1. The nature of the resinous substance which is caused to react with the shell liquids.
2. The proportions of the ingredients.
3. Whether or not a catalyst is used.
4. The nature and quantity of the catalyst.
5. The reaction temperature.
6. The allowable time for the reaction.
7. The character of the plant equipment.

By suitably selecting the reagents and plant equipment and controlling the other variable factors, it is possible to produce under optimum reaction conditions reaction products of desired physical and chemical characteristics. As an indication of the possibilities, it may be stated that I have produced both liquid and solid reaction products, the liquid products ranging in consistency from two or three times that of the unreacted shell liquids to that of molasses, and the solid products ranging from very soft to grindably hard resinous materials.

Referring first to the plant equipment, I have found it advantageous to carry out the process in a reaction vessel or still equipped with a high speed agitator and a condenser for both reflux and distillation positions. The still should be of a type and construction for heating at temperatures from 200° to 600° F. and should preferably be water-jacketed for rapid cooling. It may be provided with a bottom outlet for ready removal of the product.

The resinous substances which are reacted with the shell liquids may be either natural or synthetic resins, provided that they are fusible and contain one or more reactive phenolic hydroxyl groups, and provided further that they do not contain an aldehyde-derived carbon atom which can constitute a point of reaction, that they do not react as or in the manner of aldehydes, and that they do not under the conditions of the reaction liberate or render available any appreciable amount of aldehyde for reaction with the shell liquids. Furthermore, the resinous substance should be of the type that can per se react with hardening agents containing methylene groups, such as hexamethylene-tetramine, to set up quickly and yield strong thermo-rigid masses.

Not only does the presence of the reactive phenolic hydroxyl groups permit of a unique reaction with the cashew nut shell liquid, its derivatives or equivalents, but it also increases the ratio of phenolic hydroxyl groups per unit weight of finished product. It is the presence of phenolic hydroxyl groups that imparts to such resins their potentiality of being convertible to thermo-rigid masses when suitable hardening agents are employed. The cashew nut shell liquid, while in itself containing ingredients possessed of phenolic hydroxyl groups, evidently does not contain a sufficient number of such phenolic hydroxyl groups, and for this reason, these products cannot yield the degree of thermo-rigidity that characterizes fully cured phenol-formaldehyde resins. The method of the present invention, therefore, renders it possible for the first time to prepare synthetic resins derived from the shell liquids of the cashew and marking nuts that can set up quickly and are possessed of a high degree of thermo-rigidity; characteristics which previously have been found in only a relatively few types of resins.

Among the natural resinous substances which have been found suitable may be mentioned gum accroides and dragon's blood. Both of these materials are fusible and contain reactive phenolic hydroxyl groups, and, furthermore, they are incapable of releasing aldehydes or of reacting as an aldehyde.

Many phenol-aldehyde condensation products are suitable for use in practicing the teachings of the present invention. Specifically, the type of phenol-aldehyde resin suitable is that belonging to the so-called class of permanently fusible or novolaks, and, in general, this type does not liberate any aldehyde, nor can this type be used as a substitute for an aldehyde. As a specific example may be mentioned the product of Durite Plastics, Incorporated, Philadelphia, Pennsylvania, known as "Durite No. 291." This material is a phenol-formaldehyde reaction product prepared with a minimum quantity of formaldehyde—upon heating it fuses but does not liberate any aldehyde. As another specific example may be mentioned any of the phenol-furfural resins made by the same company, those prepared with a low furfural to phenol ratio (1:2) being preferred. The strongest and best ultimate products are obtained when the phenol-aldehyde resin used in practicing the invention is one made from carbolic acid, $C_6H_5OH$, rather than its homologues as represented by cresol, xylenol, etc.

I may also use an initial phenol condensation product made in the following manner:

Phenol (600 parts) is refluxed with 400 parts of aqueous formaldehyde (38.5%) together with a small quantity of catalyst. The mixture is refluxed for an hour and a half after separation has set in, and is then partially dehydrated under a 20" vacuum for about 45 minutes or until a melting point of around 150° F. has been attained.

Instead of the resinous substances above mentioned, I have found it possible to use certain normally non-resinous substances which are readily convertible to fusible resins, provided that they contain reactive phenolic hydroxyl groups and are incapable of generating aldehydes under the conditions of the reaction. As examples of such substances may be mentioned the class of phenolic mono-alcohols such as saligenin, as well as di- and tri-phenyl methanes containing one or more reactive phenolic hydroxyl groups, e. g. para-dihydroxy-diphenyl methane, or trihydroxy-triphenyl methane or its carbinol. The phenolic poly-alcohols are, in general, unsuited in the practicing of the present invention, due to the fact that they all liberate more or less aldehyde during the processing, and, as has already been pointed out, the presence of such aldehydes renders the process inoperative for the production of desirable resins.

In view of the foregoing, the term "resinous phenols" will be used in the specification and claims to include not only the synthetic and natural resins but, also, such normally non-resinous substances which are readily converted into resinous bodies, and which in either their normally non-resinous or resinous forms are suitable for my purposes, provided, of course, that they are incapable of generating aldehydes under the conditions of the reacton, or of entering into reaction after the manner of aldehydes.

The resinous phenols suitable for use in the present invention may be more specifically defined by referring to them as "permanently fusible, non-aldehydic, reactive phenolic hydroxyl group containing resins which do not liberate or render available any aldehydes, nor contain any combined aldehyde in a condition to constitute a potential point of reaction for combination with the cashew nut shell liquid, and which can readily react with hexamethylenetetramine to yield strong thermo-rigid masses, that is, phenolic resins, which per se in conjunction with suitable hardening agents are suitable for use in the molding arts."

It has been stated that the presence of appreciable amounts of aldehydes appears to render the reaction between resinous phenols and the shell liquids exceedingly difficult to control and almost invariably results in the formation of substantial amounts of rubbery substances which are dispersed throughout the reaction mixture. It should also be stated that in order to obtain resultant products having the unique desirable properties possessed by the products of the present invention, it is essential that the resinous phenols utilized for reaction with the shell liquids be of the type above defined. For instance, the products derived by reacting cashew nut shell liquid with aldehydes, or with resinous phenols in the presence of aldehydes, or with resinous phenols that react as or in the manner of aldehydes due to the presence of either aldehyde groups or carbon atoms originally derived from aldehydes and which are still capable of entering into further reaction, are, on the whole, subject to marked atmospheric oxidation and are, therefore, in marked contrast to the products of the present invention possessed of poor keeping qualities.

As has been indicated, there are a number of resinous phenols belonging to the foregoing class or type that may be used in practicing the present invention. The following are some of the factors that may be taken into consideration in selecting a particular resinous phenol for reaction with the shell liquids:

In the first place, all other things being the same, certain of the resinous substances do not require as high reaction temperatures as certain of the others. As an instance may be cited the fact that "Durite No. 291" requires a somewhat higher reaction temperature than do most of the other resinous substances previously enumerated.

In the second place, certain resinous substances are apparently capable of reacting with larger quantities of the shell liquids than others. For example, in the case of phenol-formaldehyde resins of the type of "Durite No. 291," the reaction proportions are less than one part of shell liquids to two of resin, while in the case of a phenol-furfural resin it is possible to react as high as 60% of shell liquids. This fact is of considerable importance as many of the desirable properties of the final product, such as shock resistance, appear to depend to a considerable extent upon the presence of anacardic acid residues.

In the third place, physical properties of the final or ultimate product are in a large measure predetermined by the reagents involved in their generation. For example, though, as previously stated, the ultimate products of the invention have greatly improved electrical properties as compared with the starting materials, the ultimate products from resinous phenols of fairly good electrical properties have better electrical properties than ultimate products made from resinous phenols of relatively poor electrical properties.

As previously pointed out, I have found it to be particularly advantageous, and for this reason prefer, to use a phenolic resin of the type that can per se be reacted with a suitable hardening agent to set up to strong, thermo-rigid masses. In this respect, the resins derived from phenol (carbolic acid) are vastly superior to those derived from cresol, xylenol, etc. For this reason, I prefer, as previously stated, to employ resins made from carbolic acid rather than those made from the higher homologues of phenol. In this connection, it is to be noted that the resins which I prefer to react with the shell liquid and their intermediate reaction products are substantially insoluble in drying oils, in marked contrast to cresol resins and their shell liquid reaction products.

As has already been indicated, the reaction between the shell liquids or anacardic acid and the resinous substances can be carried out with or without the assistance of a catalyst or condensing agent, the function of the catalyst or condensing agent being to induce the reaction and to carry it to the desired stage of condensation or polymerization at lower temperatures than would otherwise be necessary. The use of catalysts also permits one to speed up the reaction.

Various substances have been found suitable for use as catalysts or condensing agents. Organic acids such as oxalic and mineral acids such as sulphuric, hydrochloric, phosphoric and hydrobromic acids may be employed. In the case of the strong mineral acids, the catalyst should first be dissolved in a relatively large quantity of an organic solvent such as alcohols, glycols, phenol, cresol, etc., to prevent excessive condensation of the shell liquids.

The monosulphonic acids are particularly well adapted for use as catalysts or condensing agents. They appear to be initially milder than the mineral acids, though ultimately just as powerful and effective in their catalytic action. As examples of sulphonic acids which have been found suitable may be mentioned ethyl sulphonic and phenol sulphonic acids.

Excellent results have been obtained using neutral esters of strong mineral acids. The neutral esters are initially possessed of substantially zero catalytic activity, but under the influence of heat and moisture they undergo a progressive hydrolysis liberating strongly acidic substances which are effective catalysts or condensing agents. It follows, therefore, that these catalytic agents before they attain their maximum catalytic activity become uniformly distributed throughout the reaction mixture, thus assuring a smooth and readily controlled reaction which results in ultimate products having a uniform and homogeneous character. As an example of a suitable ester for use as a catalyst or condensing agent may be mentioned diethyl sulphate.

As indicated by the list of variables which affect the reaction, the quantity of catalyst is a factor which is dependent upon such variables as the temperature that is to be employed in the process (which temperature may be restricted by certain other considerations such as the structural limitations of the plant equipment), the reactivity of the resinous substance which is to be reacted with the shell liquids, the activity of the catalyst, the allowable time for the completion of the reaction and the desired characteristics of the intermediate product. Inasmuch as the desired product can be obtained without employing any catalyst at all, it follows that the minimum limiting quantity for the catalyst is zero. On the other hand, the maximum limiting quantity is set by the fact that excessive quantities of catalyst result in an undue amount of polymerization or condensation of the shell liquids. All other things being equal, the optimum amount of catalyst necessary to obtain an intermediate product of given properties depends to a large extent upon the reactivity of the resinous substances as well as the activity of the particular catalyst. A lesser amount of a given catalyst is necessary in the case of a very reactive material such as a phenol-furfural resin than in the case of a much less reactive material such as a phenol-formaldehyde resin of the "Durite No. 291" type. Likewise, a lesser amount of a very active catalyst such as sulphuric acid or diethyl sulphate is necessary to produce a given result than if a relatively weak catalyst such as oxalic acid were used.

By way of example, it may be stated that when sulphuric acid is the catalyst, the optimum quantity for a resinous material of moderate reactivity ranges from .1 to .4 of one per cent based upon the combined weights of the reagents. The other strong mineral acids such as hydrochloric and hydrobromic may be employed upon an equivalent basis in terms of molar units. If diethyl sulphate is used as the catalyst, the optimum amount ranges from .1 to .5 of one per cent based upon the combined weights of the reagents. If a relatively weak catalyst such as phosphoric acid is used, the optimum quantity ranges from 1 to 3%. If a very weak catalyst such as oxalic acid is used, a much larger amount, depending upon other conditions, may have to be used.

When using the preferred form of reaction vessel, it has been found that the temperatures necessary to produce products of desired physical and chemical properties range from 200° to 600° F., depending upon the other factors previously enumerated. As has already been pointed out, the phenol-formaldehyde resins of the "Durite No. 291" type require somewhat higher reaction temperatures than do most of the other resinous substances previously mentioned. It is also to be noted that, generally speaking, the higher the reaction temperature the shorter the time necessary to obtain a given result. The use of catalysts or condensing agents renders it possible to induce the reaction and to carry it to the desired stage at lower temperatures than would otherwise be necessary. It should be noted, however, that there are certain minimum time-temperature schedules below which no appreciable reaction occurs. Likewise, there are certain maximum time-temperature schedules which when exceeded, produced difficultly-controllable reactions and over-reacted products.

It is important to note that there is a sharp line of demarcation between the substantially unreacted products which are produced below the minimum time-temperature schedules and the over-reacted products which are obtained when the maximum schedule is exceeded. The unreacted products are merely heterogeneous mixtures of the shell liquids and resinous substances, while the over-reacted products vary from rubber-like masses to charred infusible material. In marked contrast to these unsatisfactory materials are the reaction products of the present invention, which, depending upon the conditions previously discussed, range from more or less viscous, homogeneous liquids to grindably hard resins of uniform texture, which are fusible and more or less soluble in various organic solvents other than the drying oils.

The foregoing differences provide a convenient means for readily determining the end point of the reaction for the production of the products of the present invention. Samples are withdrawn from the the reaction mixture at periodic intervals and cooled. When a sample of the desired physical characteristics is obtained, the reaction is considered as having reached the end point.

As will hereinafter be pointed out, in the illustrative embodiment of the invention the reaction is stopped when the product is grindably hard. Products that may be too soft for grinding may be readily converted to grindably hard products by the addition of small quantities of finely divided oxides such as those of zinc, magnesium, etc.

The products which are formed by the reaction may be caused to react, condense or polymerize further by means of heat with or without additional reagents, catalysts, condensing agents, or hardening agents. As suitable hardening agents may be mentioned paraldehyde, hexamethylenetetramine (hexa), various addition products of hexa such as mono-hexa-oxalate, mono-hexa-phthalate or mixtures of two or more of said materials. A blend of hardening materials which has been found eminently suitable contains mono-hexa-oxalate, mono-hexa-phthalate and a-nitro-naphthalene.

Another substance which has proved exceptionally effective as a hardening agent is the acetone formaldehyde reaction product disclosed in application Serial No. 182,010, filed December 27, 1937, by E. E. Novotny and G. K. Vogelsang (now Patent No. 2,191,802, issued February 27, 1940). Briefly stated, this resinous complex may be made by first condensing a ketone such as acetone with an aldehyde such as formaldehyde in the presence of an alkaline condensing agent until one of the reagents is consumed, and then condensing the product further in the presence of an acid catalyst. Potentially reactive resins containing acetone-formaldehyde reaction product as the hardening agent are particularly suited for use in cold molding.

The hardening agents may be incorporated with the reaction product in various ways. When acetone-formaldehyde reaction product is employed as the hardening agent, it may be fused in with the hot reaction mixture. In the case of the other hardening agents, they may advantageously be mixed with the cold ground reaction product.

Several illustrative methods will now be given for making a hard, grindable fusible resin particularly suitable for the preparation of a molding composition.

*Example I*

A phenol-aldehyde resin of the permanently fusible type such as "Durite No. 291" is mixed with a half part of hot cashew nut shell liquid and the temperature of the mixture is slowly increased until the neighborhood of 550° F. is reached. The starting resin is substantially insoluble in heated shell liquid, and solution does not occur until after reaction has set in, which reaction proceeds at a slow and readily controllable pace. The reaction mixture is kept at this temperature until a sample withdrawn from the reaction vessel and cooled is homogeneous and grindably hard. It is then cooled somewhat and poured into cooling trays. When the mass becomes cold, it may be readily ground, after which it may be mixed with a suitable hardening agent such as those which have already been enumerated. If the acetone-formaldehyde reaction product is used as the hardening agent, it may advantageously be fused into the reaction mass in the manner described under Example II.

*Example II*

One part of cashew nut shell liquid is heated to a temperature of between 250° to 350° F., and then there are added two parts of a phenol-aldehyde resin of the permanently fusible type such as "Durite No. 291." The mass is continuously stirred and the temperature is gradually brought up to about 550° F., kept at this temperature until a sample indicates that the end point has been reached. Then, still with continued stirring the temperature of the mass is allowed to drop to about 300° F. At this point, one part of a hardening agent such as the actone-formaldehyde reaction product previously described is added and permitted to fuse and become incorporated into the mass. The homogeneous product that results is then poured into pans, and after it has cooled sufficiently, is ground.

*Example III*

The use of a catalyst is illustrated in this example.

The ingredients and proportions are the same as in the Examples I and II. One-half of one percent of diethyl sulphate, on the weight of the reagents, is dissolved in two to five parts of phenol or cresol, and the solution is added to the cashew nut shell liquid. The processing is carried out as before, except that the optimum temperature in this instance usually ranges between 425° to 475° F. The reaction temperature can be further lowered by the use of more catalyst. A harder product can be obtained by increasing the temperature range, or by increasing the quantity of catalyst with or without decreasing the reaction temperature. After cooling and grinding, a suitable hardening agent is incorporated.

*Example IV*

One part of cashew nut shell liquid is heated to approximately 300° F., approximately one and a half parts of gum accroides are added and the temperature is gradually raised to about 550° F. The temperature is kept at about this level until the end point is reached, and then the product is poured. After the product cools, it is ground and incorporated with suitable hardening agents such as have already been enumerated. If the acetone-formaldehyde resinous product is used for this purpose, it is preferably added before the pouring step in the manner described under Example II.

If the foregoing method is carried out with a catalyst or condensing agent, the optimum reaction temperature can be reduced to between 350° and 400° F.

*Example V*

One part of cashew nut shell liquid is heated to about 300° F., and then about three quarters of a part of "Durite No. 291" is fused in. Then there is added approximately one part of gum accroides or dragon's blood. The temperature is then gradually raised to 550° F. with constant stirring, and the temperature maintained at about this level until the end point is reached. The mass is then ready for pouring and for the incorporation of a suitable hardening agent.

The use of a catalyst in the foregoing process renders possible a decrease in reaction temperature, depending, as has been pointed out, on the nature and quantity of the catalyst.

*Example VI*

Four hundred parts of a resin, made by reacting fifty parts of furfural with one hundred parts of phenol in the presence of a catalyst such as an alkali carbonate, are heated together with cashew nut shell liquid to about 500° F., and the temperature kept at about this point until a sample, withdrawn from the reaction mixture and cooled, is hard and grindable. A suitable hardening agent may then be incorporated.

If a catalyst or condensing agent is used, the reaction temperature can be considerably reduced. Thus, if three parts of diethyl sulphate are added to the reaction mixture as soon as complete solution occurs, a maximum temperature of about 380° F. is sufficient. This temperature can be further reduced by using more catalyst.

As has been stated, the synthetic resins of the present invention, depending upon a number of controllable factors previously enumerated, vary considerably in both physical and chemical properties. However, they all have certain properties in common; namely, they are fusible and are capable of being hardened by reaction with hardening agents such as compounds containing reactive methylene groups such as hexamethylenetetramine. They may, therefore, be described as fusible synthetic resins of the type capable of being cured to a state of thermo-rigidity and infusibility by means of hardening agents. In analogy with the phenol-aldehyde resins, they may be classified as phenolic resins of the permanently fusible or Novolak types. They may also be classified as resins of the two-stage type, in that, as previously noted, they are permanently fusible but are capable of reacting with hardening agents to produce thermo-rigid ultimate products.

The resins prepared in accordance with the foregoing illustrative procedures are grindably hard, fusible materials, which are eminently suitable for a wide range of useful applications in the industries, being particularly well adapted for the preparation of molding compositions. Molding compositions made from these resins have a characteristic "high flow," due very likely to the fact that they are made from cashew nut shell liquid, which is possessed of the inherent capability of imparting high flows. This characteristic renders it possible to use the present compositions for a large number of uses and applications where many previously known compositions would be unsuitable, and also permits the incorporation of unusually high percentages of inexpensive fillers. As an indication of the various kinds of fillers, plasticizers and other modifying materials that may readily be admixed with the resins of this invention may be mentioned natural and synthetic resins such as copal, rosin, fossil gum, gum accroides, kauri, coumarone and phenol-aldehyde resins, waxes, pitches, siccative oils such as linseed oil, tung oil, rape-seed oil, castor oil, and fish oil, and fillers such as ground slate, wood flour, zinc oxide, barytes, iron oxide, asbestos, paper pulp, and silica.

The fact that the resins of the present inventions are made from inexpensive reagents such as the shell liquids, and can be admixed with large percentages of inexpensive fillers and modifying agents makes it possible to produce these materials at very low cost in marked contrast to other types of resinous materials. Another factor that keeps down the cost of the resultant product is the ease and uniformity with which the process of the invention can be controlled. The fact that the reaction is carried out in the absence of appreciable amounts of aldehydes reduces to a minimum the possibility that the products in their intermediate stages will "kick over" or "go bad." Resins which have "gone bad," i. e. have prematurely been converted to their ultimate infusible form, generally have to be discarded, their manufacturing cost being added to the cost of the satisfactory batches, thereby raising the cost of the product.

In this connection, it is to be noted that the products of the invention exhibit remarkable stability or keeping qualities. As an indication of their stability, it may be stated that the potentially reactive products of the invention can be kept for very long periods of time in the presence of air without any appreciable or noticeable change in fusibility, solubility, plasticity, etc. This characteristic renders it unnecessary to take any special precautions to prevent the intermediate products from being unintentionally converted during storage to the ultimate insoluble and infusible stage.

In their final or ultimate state, the products of the invention are insoluble and infusible and possess exceptional flexibility, mechanical and dielectric strength, shock resistance (impact strength), durability, toughness, and resistance to moisture, gases and chemicals as well as to comparatively high temperatures. It should also be noted that the products are odorless, and furthermore have unusually low specific gravities and electrical conductivities, as well as exceptionally high frictional coefficients.

The molding compositions of the invention are suitable for either hot or cold molding, and are particularly well adapted for casting processes and extrusion molding.

Products made in whole or in part of the materials of the present invention may be formed in various shapes and forms, such as sheets or webs, tubes, rods, etc.

As specific examples of articles which may be made either in whole or in part of the materials of this invention may be mentioned abrasive wheels, noiseless gears, phonograph records, printing plates, brake linings, containers particularly for foodstuffs and beverages, refrigerator strips and utensils, electrical insulation, etc.

It is to be understood that the foregoing disclosure is intended to be illustrative rather than restrictive, and that no limitations are to be imported which are not required by the language of the appended claims and the state of the prior art. It is to be further understood that the invention is not dependent upon any explanations or theories which have been set forth as descriptive of the actions involved, nor dependent upon the soundness or accuracy of any theoretical statements so advanced.

This application is a continutaion in part of application Serial No. 158,701 filed August 7, 1937.

I claim:

1. The method of producing an oil-insoluble, potentially reactive synthetic resin, which comprises heating a mixture consisting of the shell liquid of a nut of the Cashew Family and a permanently fusible phenolic resin that can per se react with hardening agents containing reactive methylene groups, said phenolic resin being selected from the group consisting of carbolic acid-formaldehyde condensation products, phenol-furfural condensation products, gum accroides and dragon's blood, the heating being continued until a sample withdrawn from the reaction mixture and cooled is homogeneous and grindably hard, and then incorporating a hardening agent.

2. An oil-insoluble, potentially reactive synthetic resin produced by the method defined in claim 1.

3. The method of producing an oil-insoluble, potentially reactive synthetic resin, which comprises heating a mixture consisting of the shell liquid of a nut of the Cashew Family and a permanently fusible phenolic resin that can per se react with hardening agents containing reactive methylene groups, said phenolic resin being selected from the group consisting of carbolic acid-formaldehyde condensation products, phenol-furfural condensation products, gum accroides and dragon's blood, the heating being carried out in the presence of an acidic catalyst and being continued until a sample withdrawn from the reaction mixture and cooled is homogeneous and grindably hard, and then incorporating a hardening agent.

4. The method of producing an oil-insoluble, potentially reactive synthetic resin, which comprises heating a mixture consisting of the shell liquid of a nut of the Cashew Family and a permanently fusible resinous carbolic acid-formaldehyde condensation product that can per se react with hardening agents containing reactive methylene groups, the heating being continued until a sample withdrawn from the reaction mixture and cooled is homogeneous and grindably hard, and then incorporating a hardening agent.

5. An oil-insoluble, potentially reactive synthetic resin produced by the method defined in claim 4.

6. The method of producing an oil-insoluble, potentially reactive synthetic resin, which comprises heating a mixture consisting of the shell liquid of a nut of the Cashew Family and a phenol-furfural condensation product, the heating being continued until a sample withdrawn from the reaction mixture and cooled is homogeneous and grindably hard, and then incorporating a hardening agent.

7. An oil-insoluble, potentially reactive synthetic resin produced by the method defined in claim 6.

8. The method of producing an oil-insoluble, potentially reactive synthetic resin, which comprises heating a mixture consisting of the shell liquid of a nut of the Cashew Family and gum accroides, the heating being continued until a sample withdrawn from the reaction mixture and cooled is homogeneous and grindably hard, and then incorporating a hardening agent.

9. An oil-insoluble, potentially reactive synthetic resin produced by the method defined in claim 8.

EMIL E. NOVOTNY.